(12) United States Patent
Juillet

(10) Patent No.: US 9,787,077 B2
(45) Date of Patent: Oct. 10, 2017

(54) ARC PROOF COVER INSPECTION SLEEVE

(71) Applicant: Christopher Juillet, Hoboken, NJ (US)

(72) Inventor: Christopher Juillet, Hoboken, NJ (US)

(73) Assignee: Richards Manufacturing Company Sales, Inc., Irvington, NJ (US)

( * ) Notice: Subject to any disclaimer, the term of this patent is extended or adjusted under 35 U.S.C. 154(b) by 215 days.

(21) Appl. No.: 14/476,722

(22) Filed: Sep. 3, 2014

(65) Prior Publication Data

US 2015/0380921 A1 Dec. 31, 2015

Related U.S. Application Data

(60) Provisional application No. 62/017,234, filed on Jun. 25, 2014.

(51) Int. Cl.
*H02G 15/00* (2006.01)
*H02G 15/184* (2006.01)

(52) U.S. Cl.
CPC ................................ *H02G 15/184* (2013.01)

(58) Field of Classification Search
CPC .... H02G 15/184; H02G 15/08; H02G 15/103; H02G 15/18; H02G 15/30; H02G 15/00; H02G 15/007
USPC ........ 174/68.1, 68.3, 72 A, 75 R, 74 R, 135, 174/70 C, 92, 88 R, 73.1
See application file for complete search history.

(56) References Cited

U.S. PATENT DOCUMENTS

| | | | | |
|---|---|---|---|---|
| 3,325,591 A * | 6/1967 | Wahl | ........................ | H01R 4/70 174/92 |
| 3,692,922 A * | 9/1972 | Sugimoto | ............ | H02G 15/184 174/73.1 |
| 3,992,569 A * | 11/1976 | Hankins | ............... | H02G 15/003 174/92 |
| 4,099,021 A * | 7/1978 | Venezia | ................. | H02G 15/10 174/73.1 |
| 4,314,093 A * | 2/1982 | Eldridge | .............. | H02G 15/184 174/73.1 |
| 4,435,612 A * | 3/1984 | Smith | .................... | H02G 15/10 174/92 |
| 4,666,537 A * | 5/1987 | Dienes | ................. | H02G 15/117 174/88 R |
| 4,732,628 A * | 3/1988 | Dienes | ................... | H02G 15/18 174/88 R |
| 4,908,482 A * | 3/1990 | Shimirak | ............. | H02G 15/117 174/92 |
| 5,561,269 A * | 10/1996 | Robertson | ................ | H01R 4/70 174/92 |
| 5,802,715 A * | 9/1998 | O'Neill | ................ | H02G 15/007 156/56 |

(Continued)

*Primary Examiner* — Angel R Estrada
(74) *Attorney, Agent, or Firm* — Bakos & Kritzer

(57) ABSTRACT

An arc proof cover with an integrated window is disclosed. The arc proof cover comprises a body and cover composed of arc and track resistant material. The body includes a first end, second end, and at least one window. In a closed position, the cover is placed over the at least one viewing window. A locking mechanism secures the closed position of the cover. When the locking mechanism is disengaged, the cover can be moved to allow visual inspection of the connectors within the arc proof cover. The body further includes an opening along its length which allows for the wrapping and unwrapping of the arc proof cover around the connectors of an assembled cable accessory.

19 Claims, 6 Drawing Sheets

(56) References Cited

U.S. PATENT DOCUMENTS 7,663,065 B2 * 2/2010 Chen .................. H01R 13/6589
174/51

* cited by examiner

ARC PROOF COVER INSPECTION SLEEVE

CROSS-REFERENCE TO RELATED APPLICATION

The present invention claims priority to U.S. Provisional Application Ser. No. 62/017,234, filed on Jun. 25, 2014, and entitled "Arc Proof Cover Inspection Sleeve."

TECHNICAL FIELD

The present invention relates generally to arc proof covering in the field of high voltage power connectors utilized in power distribution systems.

BACKGROUND OF THE INVENTION

Underground cable accessories, such as cable splices and disconnectable joints (made up of metallic connectors, bolted to a rubber covered metallic central bus and covered over with molded rubber sleeves), are typically covered in an arc proofing material. This material is arc and track resistant and is capable of withstanding exposure to plasma caused by an electrical failure without degrading in accordance with industry standards. The arc proofing protects the cable accessory from damage caused by other equipment failure, contains a failure of the cable accessory itself, and impedes the failure of the cable accessory from impacting other accessories or equipment in proximity to the failing accessory. Currently, the connectors of a cable accessory are individually wrapped with arc proofing material, such as arc proofing tape or a molded boot that is wrapped around the accessory during installation.

A common problem with disconnectable joints is that the sleeve can become partially disassembled from the bus bar which can result in an electrical failure. In order to check for this condition, the arc proofing material must be removed for a splicer to visibly confirm that the sleeve is fully installed on the bus bar. Currently, this is accomplished by either cutting a window into the arc proofing tape or by removing the molded boot. Cutting the tape poses safety issues because the splicer can inadvertently cut too deep and damage the sleeve or bus bar which could cause an electrical failure. Furthermore, removing the existing arc proof molded boot requires the use of substantial force because the molded boot wraps underneath the connector of the cable accessory. The substantial force can cause excessive movement of the metallic connectors of the disconnectable joint, thereby resulting in an electrical failure.

Therefore, there is a need in the art for an arc proof cover which allows for the visual inspection of the connectors within, without moving the arc proof cover or assembled cable accessory. Disclosed herein is an arc proof cover with an integrated viewing panel, such as a window, allowing for visual inspection of the joint.

SUMMARY

An arc proof cover with an integrated inspection panel is disclosed. The arc proof cover comprises a body and cover composed of arc resistant material. The body includes a first end, second end, and at least one window. In a closed position, the cover is placed over the at least one window. Furthermore, a locking mechanism secures the closed position of the cover. The locking mechanism comprises a pair of straps attached to the cover. The straps include a latch on one end and a hook on the other end. To engage the locking mechanism, the straps are wrapped around the body of the arc proof cover and secured by connecting the hook portion of the strap to the latch portion. When the locking mechanism is disengaged, the cover can be moved to allow visual inspection of the connectors within the arc proof cover. The body further includes an opening along its length which allows the wrapping of the arc proof cover around the connectors of an assembled cable accessory.

BRIEF DESCRIPTION OF THE DRAWINGS

The detailed description makes reference to the accompanying figures wherein.

Other objects, features, and characteristics of the present invention, as well as methods of operation and functions of the related elements of the structure and the combination of parts, will become more apparent upon consideration of the following detailed description with reference to the accompanying drawings.

DETAILED DESCRIPTION OF THE PREFERRED EMBODIMENT

A detailed illustrative embodiment of the present invention is disclosed herein. However, techniques, methods, processes, systems, and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, electronic or otherwise, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the Detailed Description of the Preferred Embodiment using the singular or plural number may also include the plural or singular number respectively. The word "or," in reference to a list of two or more items, covers all of the following interpretations of the word: any of the items in the list, all of the items in the list, and any combination of the items in the list. The following presents a detailed description of the preferred embodiment of the present invention with reference to the figures.

Figure 1:
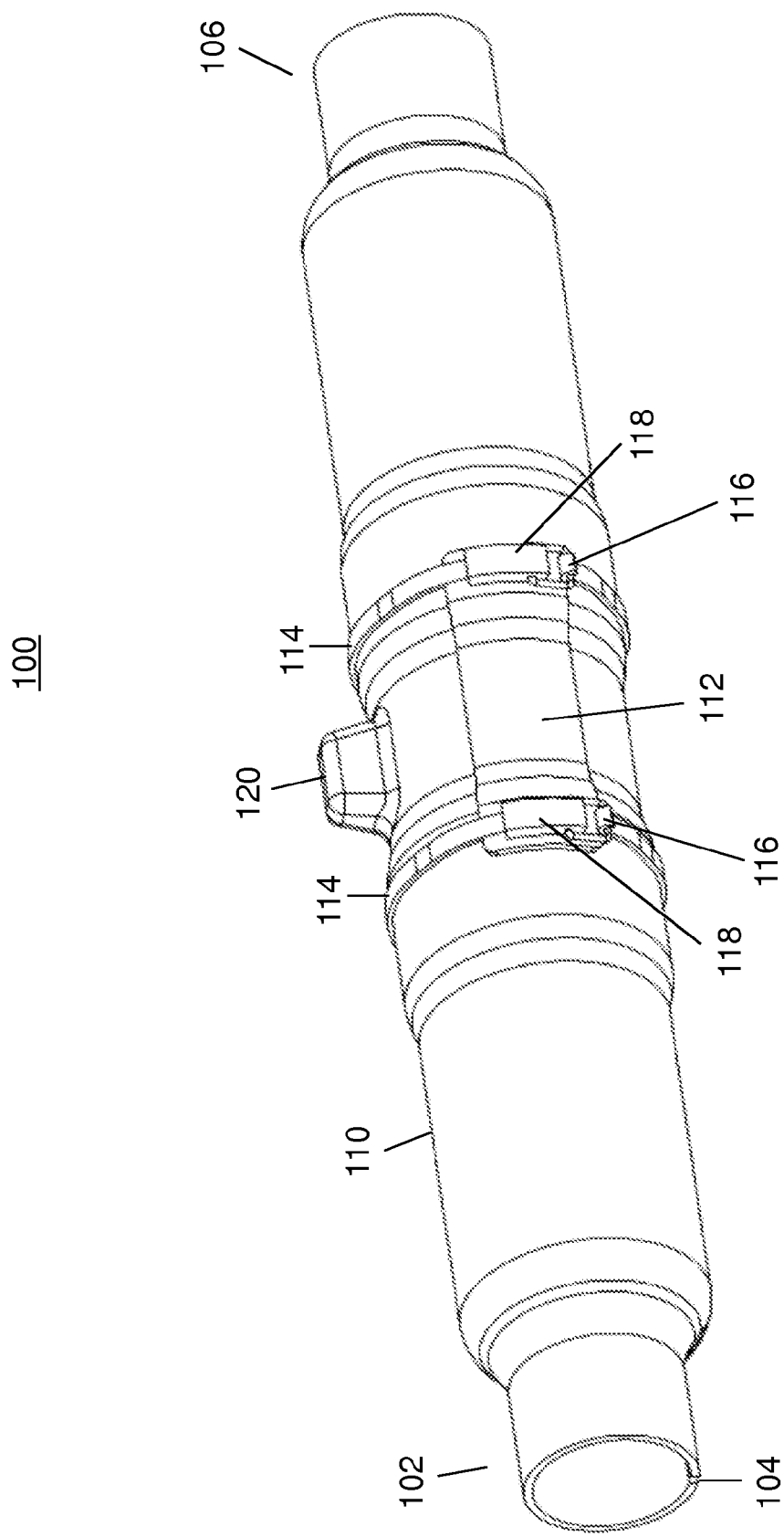
FIG. 1 illustrates a perspective view of an arc proof cover in accordance with the preferred embodiment of the present invention.

Referring initially to FIG. 1, the preferred embodiment of the present invention provides arc proof cover 100. Arc proof cover 100 comprises body 110. Body 110 consists of first end 102, opening 104, and second end 106. In the preferred embodiment, opening 104 is along the full length of body 110. Body 110 is further composed of an arc proofing and track resistant material that is flexible. The arc proofing material is preferably a self-extinguishing polymer, comprising a blend of nitrile rubber and PVC, that is compounded with flame retardants. This flexible design allows the width of opening 104 to be expanded when placing arc proof cover 100 over an assembled cable accessory.

Test point cover 120 is located on the outside surface of body 110. Test point cover 120 is configured to cover the test point of the cable connector located within arc proof cover 100. It will be apparent to one skilled in the art to use a high-impedance voltage sensing device at a test point located within test point cover 120 to determine the circuit condition of the cable accessory within arc proof cover 100.

As shown in FIG. 1, arc proof cover 100 comprises flap and/or cover 112. Flap 112 is generally positioned at an intermediate portion of body 110 and composed of an arc proofing and track resistant material such as a self-extinguishing polymer, comprising a blend of nitrile rubber and PVC, that is compounded with flame retardants. Further, flap 112 can be either opaque, transparent, or semi-transparent. Flap 112 is preferably secured onto body 110 using a locking mechanism comprising strap 114, hook 116, and latch 118. As described in detail below with reference to FIG. 2, flap 112 securely covers at least one viewing window. When flap 112 is repositioned, generally by vertically lifting flap 112, a splicer can visually inspect the connectors within arc proof cover 100 to identify that the connectors are properly secured and not damaged.

Figure 2:
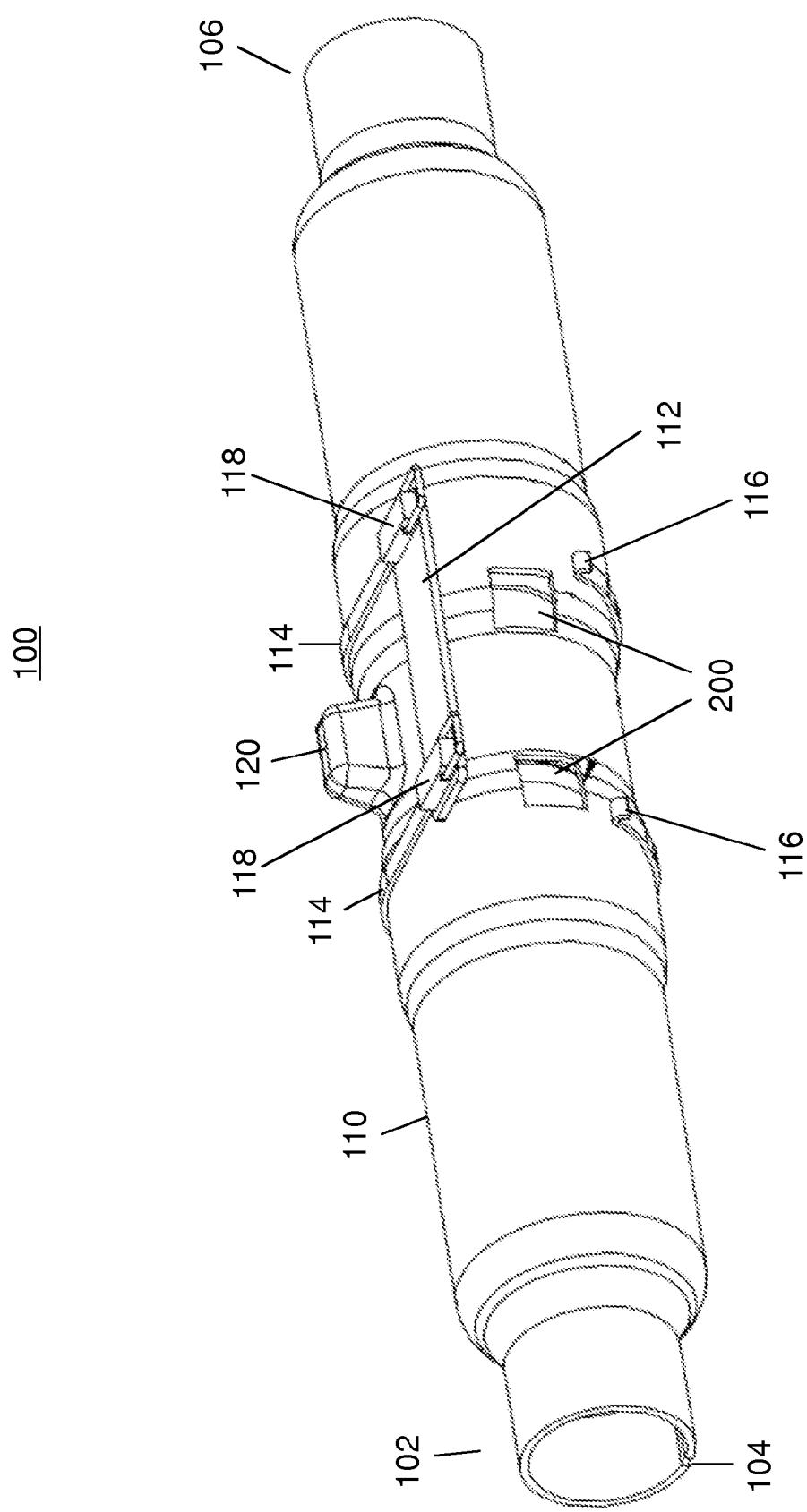
FIG. 2 illustrates a perspective view of the arc proof cover shown in FIG. 1 with the flap in an open position.

FIG. 2 depicts a perspective view of arc proof cover 100 shown in FIG. 1 with flap 112 in an open position. At least one viewing window 200 is accessible when flap 112 is in the open position. Viewing window 200 is positioned on body 110 to allow for the visual inspection of the locations where connectors mate within arc proof cover 100. Therefore, a visual inspection can be made to determine if the connectors have become disconnected without moving arc proof cover 100 or the assembled cable connector. Although the shape of viewing window 200 is shown as substantially rectangular, it would be apparent to one of ordinary in the art to utilize other shapes or sizes which allow for the visual inspection of the connectors in the arc proof cover without departing from the spirit of the present invention.

The process of securing flap 112 over viewing window 200 begins by positioning flap 112 over viewing window 200. Next, strap 114 is wrapped around body 110. Thereafter, hook 116 of strap 114 is attached to latch 118. In the preferred embodiment, strap 114 comprises an elastic material that is wrapped around body 110 through the process of stretching strap 114. Hook 116 comprises a substantially rigid material. As a result, when hook 116 is secured, the contraction from strap 114 assists in securing the position of flap 112. In an alternative embodiment, the straps can comprise a substantially inelastic material and locking mechanism for securing the strap. It would be apparent to one of ordinary skill in the art to utilize other locking mechanisms without departing from the spirit of the present invention. In one embodiment, the flap can include protrusions that are configured to couple into the viewing window of the arc proof cover to provide a more secure attachment. This design ensures the proper positioning of the flap over the viewing window.

In addition to the use of flap 112 to cover the at least one window, other methods may be used to cover the at least one viewing window without departing from the spirit of the present invention. For example, a cover can be placed into the at least one viewing window and secured using an interference fit. In another embodiment, the cover can be secured using a clasping, locking, or snapping mechanism. In yet another embodiment, the arc proof cover can include a mechanism with a sliding cover placed over the at least one window. It is also possible to not use a cover or flap and mold a transparent polymer, partially transparent polymer, or other suitable material over the at least one window. As a result, the connectors of the cable accessory can be inspected without removing a cover or flap.

Arc proof cover 100 is preferably manufactured utilizing compression molding. Other manufacturing processes may be used, such as dipping, without departing from the spirit of the present invention.

Figure 3:
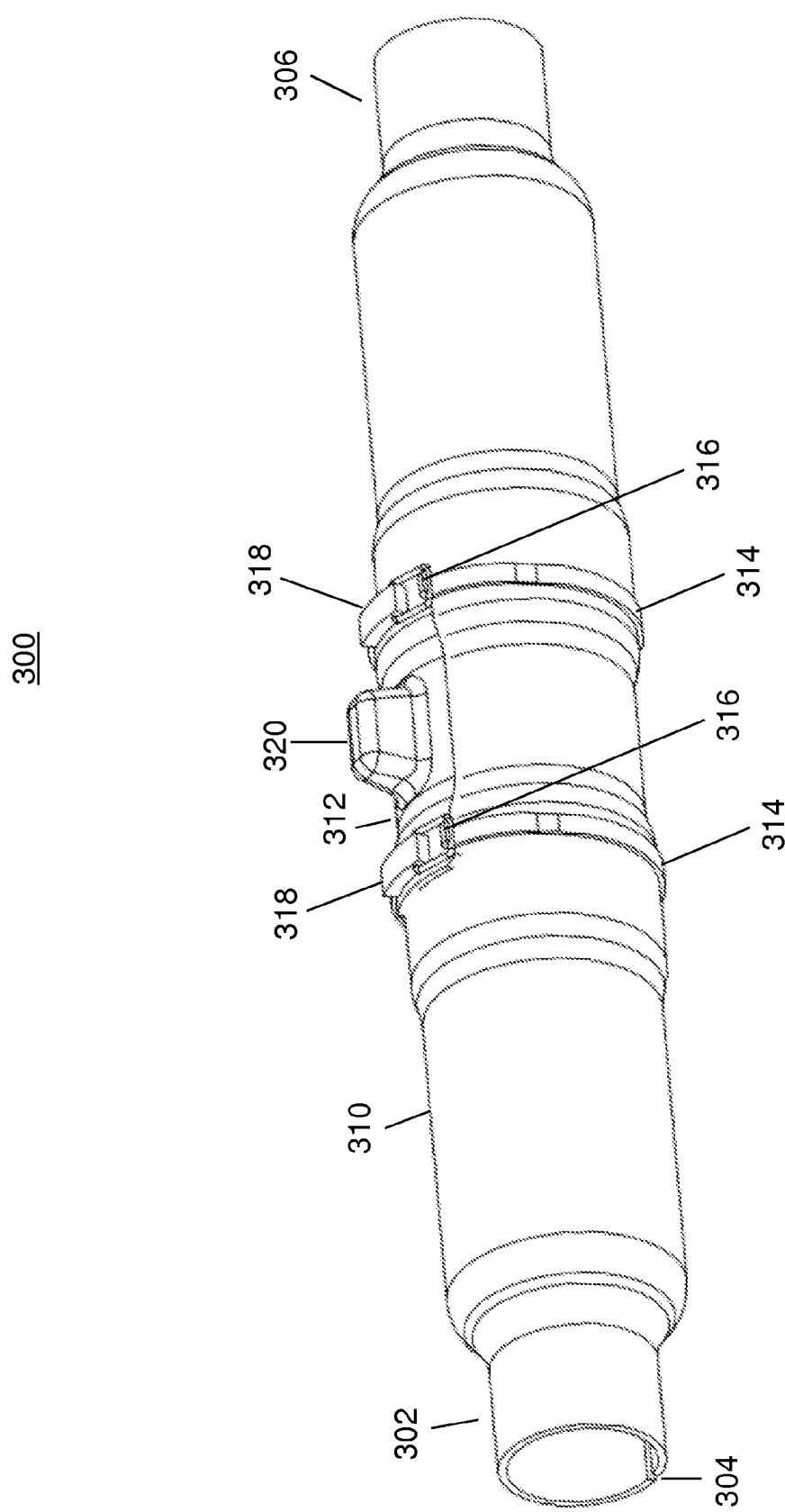
FIG. 3 illustrates a structure for an arc proof cover in which the flap comprises a testpoint.

FIG. 3 depicts an embodiment of the present invention wherein the flap comprises a test point cover. Specifically, arc proof cover 300 comprises body 310 and flap 312. Body 310 consists of first end 302, opening 304, and second end 306. Flap 312 is positioned at an intermediate portion of body 310 and includes test point cover 320. Flap 312 is secured onto body 310 using a locking mechanism comprising strap 314, hook 316, and latch 318. The locking mechanism is designed to securely hold flap 312 in a closed position to prevent the influx of environmental elements such as dirt particles, moisture, etc., into the interior portions of arc proof cover 300. This secure construction prevents such elements from interfering with the connections of the cable accessory. Unlocking the locking mechanism allows for the user to remove the flap for internal viewing and reseal the flap after viewing. As described in detail below with reference to FIG. 4, flap 312 securely covers at least one viewing window and at least one test point of the cable accessory within arc proof cover 300. When flap 312 is repositioned, generally by vertically lifting flap 312, a splicer can visually inspect the connectors within arc proof cover 300 to identify that the connectors are properly secured and not damaged. Further, the splicer can use a high-impedance voltage sensing device on the test point of the cable accessory to determine the circuit condition within.

Figure 4:
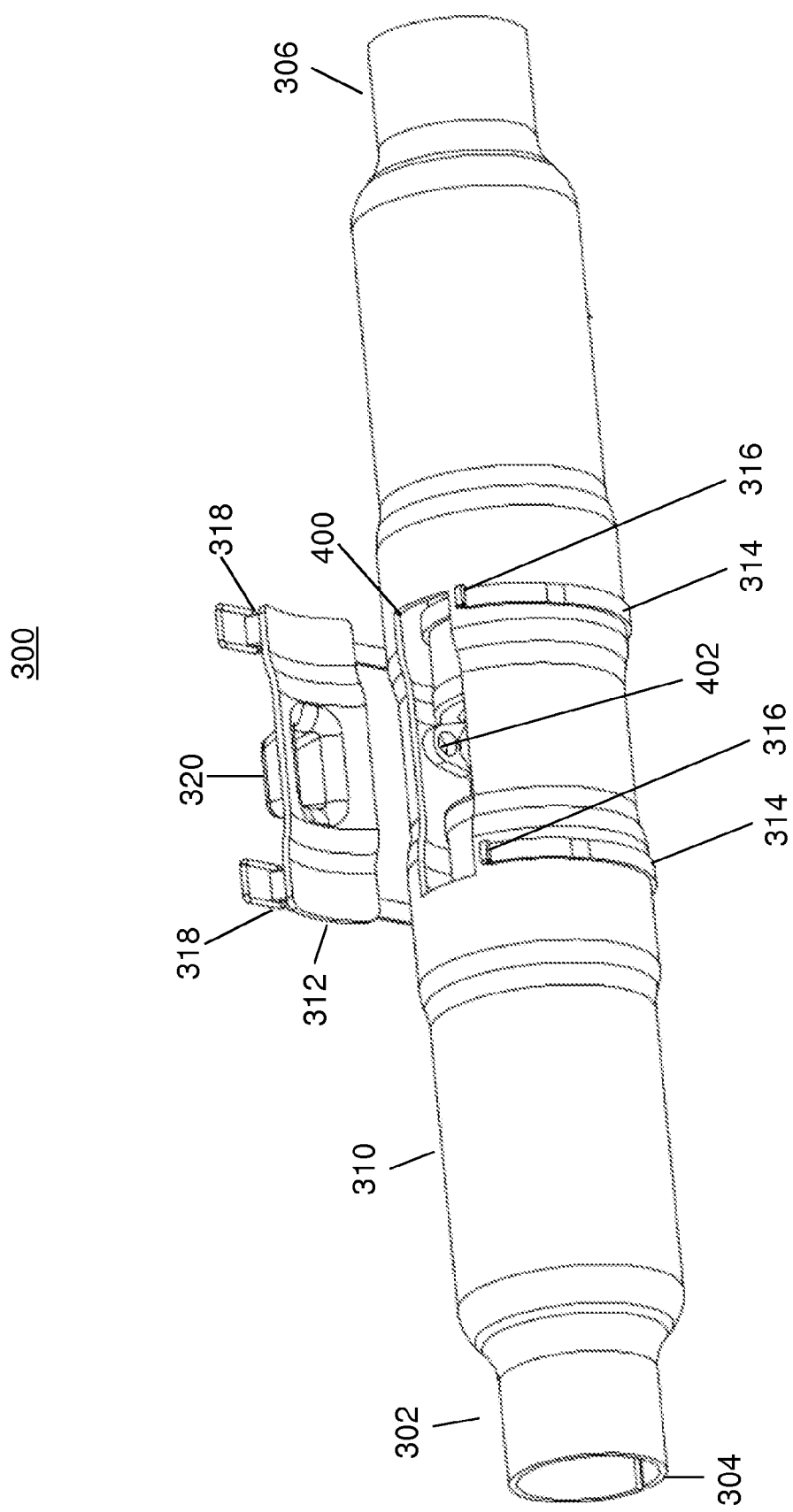
FIG. 4 illustrates a perspective view of the arc proof cover shown in FIG. 3 with the flap in an open position.

FIG. 4 depicts the embodiment of arc proof cover 300 shown in FIG. 3 with flap 312 in an open position. At least one viewing window 400 is accessible when flap 312 is in the open position. In this embodiment, viewing window 400 is positioned on body 310 to allow for the visual inspection of the connectors of the cable accessory within arc proof cover 300, and access to test point 402 of the cable accessory. As shown in FIG. 4, test point cover 320 is configured to accommodate the dimensions and configuration of test point 402. Although the shape of viewing window 400 is shown as substantially rectangular, it would be apparent to one of ordinary in the art to utilize other shapes or sizes which allow for the visual inspection of the connectors and test point in the arc proof cover without departing from the spirit of the present invention.

The process of securing flap 312 over viewing window 400 begins by positioning flap 312 over viewing window 400 and test point 402. Next, strap 314 is wrapped around body 310. Thereafter, hook 316 of strap 314 is attached to latch 318. In this embodiment, test point cover 320 couples with test point 402 to provide a more secure attachment. Furthermore, this design ensures the proper positioning of the flap over the viewing window.

Figure 5:
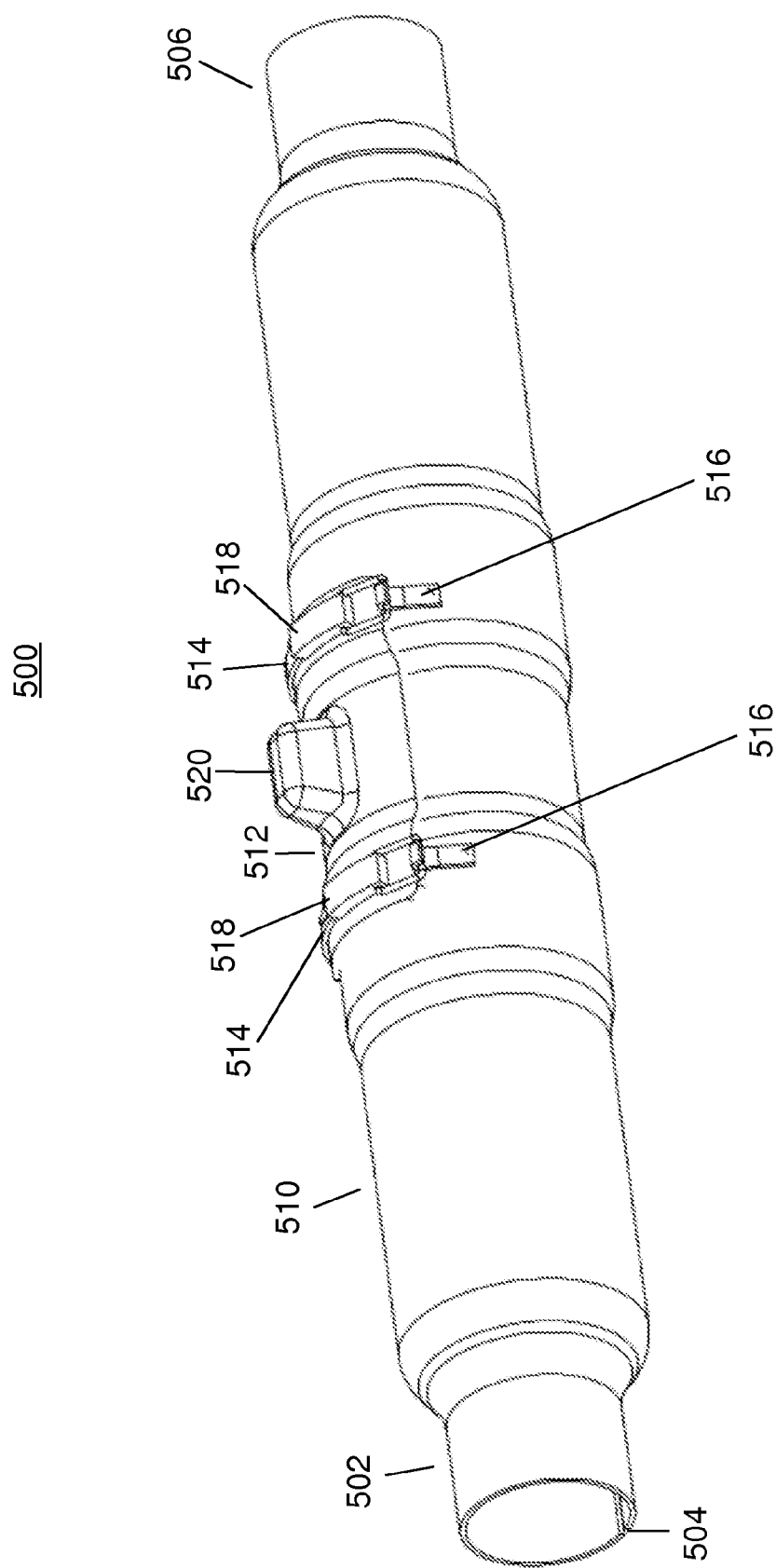
FIG. 5 illustrates a structure for an arc proof cover.

FIG. 5 depicts an embodiment of the present invention with a hook molded onto the body of arc proof cover. Arc proof cover 500 comprises body 510 and flap 512. Body 510 consists of first end 502, opening 504, second end 306, and hook 516. In this embodiment, hook 516 is made of a substantially rigid material and is molded into body 510. Flap 512 is positioned at an intermediate portion of body 510 and includes test point cover 520.

As shown in FIG. 5, an end of flap 512 is secured to body 510 with at least one strap 514. Strap 514 is preferably manufactured of an elastic material. The end of the flap could also be secured by molding the end onto the body of the arc proof cover without departing from the spirit of the present invention. An opposite end of flap 512 is secured onto body 510 by coupling latch 518 to hook 516. As described in detail below with reference to FIG. 5, flap 512 securely covers at least one viewing window and at least one test point of the cable accessory within arc proof cover 500.

Figure 6:
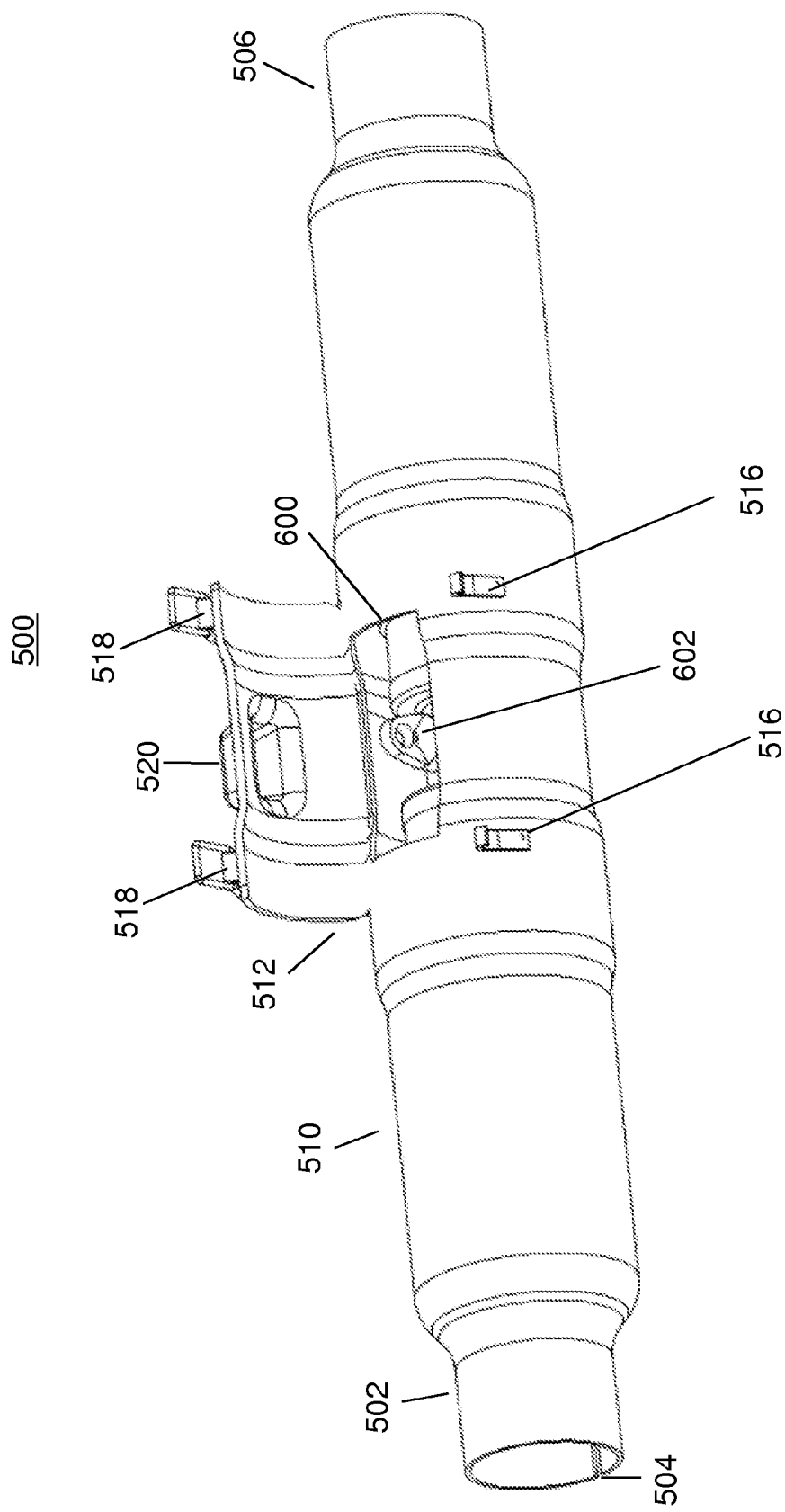
FIG. 6 illustrates a perspective view of the arc proof cover shown in FIG. 5 with the flap in an open position.

FIG. 6 depicts the embodiment of arc proof cover 500 shown in FIG. 5 with flap 512 in an open position. At least one viewing window 600 is accessible when flap 512 is in the open position. In this embodiment, viewing window 600 is positioned on body 510 to allow for the visual inspection of the connectors of the cable accessory within arc proof cover 500 as well as access to test point 602 of the cable accessory.

The process of securing flap 512 over viewing window 600 begins by positioning flap 512 over viewing window 600 and test point 602. Next, latch 518 is attached to hook 516. In this embodiment, test point cover 520 couples with test point 602 to provide a more secure attachment. Furthermore, this design ensures the proper positioning of the flap over the viewing window.

While the present invention has been described with reference to the preferred embodiment, which has been set forth in considerable detail for the purposes of making a complete disclosure of the invention, the preferred embodiment is merely exemplary and is not intended to be limiting or represent an exhaustive enumeration of all aspects of the invention. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. An arc proof cover, comprising:
   a body comprising:
      a first end,
      a second end,
      at least one viewing window, and
      an opening along the length of the body extending from the first end to the second end;
   a locking mechanism;
   at least one cover;
   wherein the body is composed of a flexible arc proofing and track resistant material; and
   wherein a width of the opening is configured to expand over a high voltage cable accessory.

2. The arc proof cover of claim 1, wherein the locking mechanism comprises:
   at least one latch; and
   at least one strap.

3. The arc proof cover of claim 1, wherein the at least one cover is composed of an arc resistant material.

4. The arc proof cover of claim 1 wherein the body is composed of a self-extinguishing polymer, comprising a blend of nitrile rubber, PVC, and flame retardants.

5. An arc proof cover, comprising:
   a hollow flexible body including a first end and a second end with an opening therethrough for expanding over a cable accessory; and
   at least one viewing window constructed of a transparent material for viewing at least a portion of said cable accessory.

6. An arc proof cover, comprising:
   a flexible body including a first end and a second end with an opening therethrough for expanding over a cable accessory;
   at least one window for viewing at least a portion of said cable accessory therein; and
   a cover to securely cover said at least one window;
   wherein said body is constructed from self-extinguishing arc-resistant polymer.

7. The arc proof cover of claim 6, wherein said cable accessory includes a test point positioned proximate said at least one window.

8. The arc proof cover of claim 6 wherein said cover is designed to accommodate the dimensions of a test point.

9. The arc proof cover of claim 6, further comprising:
   a locking mechanism.

10. The arc proof cover of claim 9, wherein the locking mechanism comprises:
    at least one latch;
    at least one hook; and
    at least one strap.

11. The arc proof cover of claim 10, wherein the locking mechanism can be unlocked to allow a user to change the position of said cover to allow for viewing and access and subsequently be relocked after viewing and access.

12. An arc proof cover, comprising:
    a body including a first end and a second end with an opening therethrough for expanding over a high voltage cable accessory;
    at least one window along a length of said body for viewing at least a portion of said cable accessory therein; and
    a cover to securely cover said at least one window; and
    a locking mechanism comprising at least one latch, at least one hook, and at least one strap.

13. The arc proof cover of claim 12 wherein said body, cover, and locking mechanism are constructed substantially from a self-extinguishing arc-resistant polymer.

14. The arc proof cover of claim 12 wherein said cover is designed to accommodate the dimensions of a test point thereby allowing access to the test point and the cable accessory.

15. The arc proof cover of claim 12 wherein said cover is constructed of a partially see-through material.

16. The arc proof cover of claim 12 wherein said body is compression molded.

17. The arc proof cover of claim 12 wherein said cover is secured by positioning the cover over said at least one window, wrapping said strap around said body, and attaching said hook to said latch.

18. The arc proof cover of claim 12 wherein said at least one hook is molded into said body and said cover is attached to said body at an end utilizing said at least one strap.

19. The arc proof cover of claim 18 wherein said cover is secured by positioning the cover over said at least one window and attaching said latch to said hook.

\* \* \* \* \*